(12) United States Patent
Tobbe et al.

(10) Patent No.: US 9,132,592 B2
(45) Date of Patent: Sep. 15, 2015

(54) APPLIANCE WITH EXPANDING FOAM MATERIAL

(71) Applicant: General Electric Company, Schenectady, NY (US)

(72) Inventors: Joseph Anthony Tobbe, Louisville, KY (US); Roger Shawn Nelson, Louisville, KY (US); Nicholas David Tackett, Louisville, KY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 60 days.

(21) Appl. No.: 13/680,423

(22) Filed: Nov. 19, 2012

(65) Prior Publication Data

US 2014/0139087 A1    May 22, 2014

(51) Int. Cl.
*B29C 70/68* (2006.01)
*F25D 23/06* (2006.01)
*B29C 44/38* (2006.01)

(52) U.S. Cl.
CPC ............... *B29C 70/68* (2013.01); *B29C 44/385* (2013.01); *F25D 23/064* (2013.01)

(58) Field of Classification Search
USPC ................. 312/400, 401, 406, 406.1
See application file for complete search history.

(56) References Cited

U.S. PATENT DOCUMENTS

| | | | | | |
|---|---|---|---|---|---|
| 3,132,382 | A | * | 5/1964 | Magester | 312/406 |
| 3,137,744 | A | * | 6/1964 | Burrus | 264/46.5 |
| 3,440,308 | A | * | 4/1969 | Carbary et al. | 264/45.3 |
| 3,933,398 | A | * | 1/1976 | Haag | 312/406 |
| 4,028,450 | A | * | 6/1977 | Gould | 264/45.5 |
| 4,419,307 | A | * | 12/1983 | Kohara et al. | 264/46.5 |
| 4,593,449 | A | * | 6/1986 | Meray-Hovarth et al. | 29/527.1 |
| 4,668,567 | A | * | 5/1987 | Williams | 428/319.9 |
| 5,753,155 | A | * | 5/1998 | Hanusa | 264/46.5 |
| 6,109,712 | A | * | 8/2000 | Haworth et al. | 312/400 |
| 6,138,432 | A | * | 10/2000 | Banicevic | 52/784.15 |
| 6,295,787 | B1 | * | 10/2001 | Lee | 52/784.15 |
| 6,889,417 | B2 | * | 5/2005 | Jones et al. | 29/530 |
| 2011/0115355 | A1 | | 5/2011 | Heckler | |
| 2013/0257257 | A1 | * | 10/2013 | Cur et al. | 312/406.1 |
| 2013/0260080 | A1 | * | 10/2013 | Roberts | 428/71 |

FOREIGN PATENT DOCUMENTS

JP          3095383 A        4/1991

* cited by examiner

*Primary Examiner* — Daniel Rohrhoff
(74) *Attorney, Agent, or Firm* — Dority & Manning, PA

(57) ABSTRACT

An appliance is provided with a cabinet having a plurality of fill holes along a rear section or panel of a cabinet whereby expandable foam material may be injected at multiple locations into voids within the cabinet. The plurality of fill holes avoids or minimizes problems with conventional methods such as sink parks, unfilled spaces, and uneven distribution. In certain embodiments, patterns or configurations of the fill holes are provided to e.g., improve the effectiveness of the injection process and conserve the amount of material required to fill the voids in the cabinet. Related methods are also provided.

20 Claims, 6 Drawing Sheets

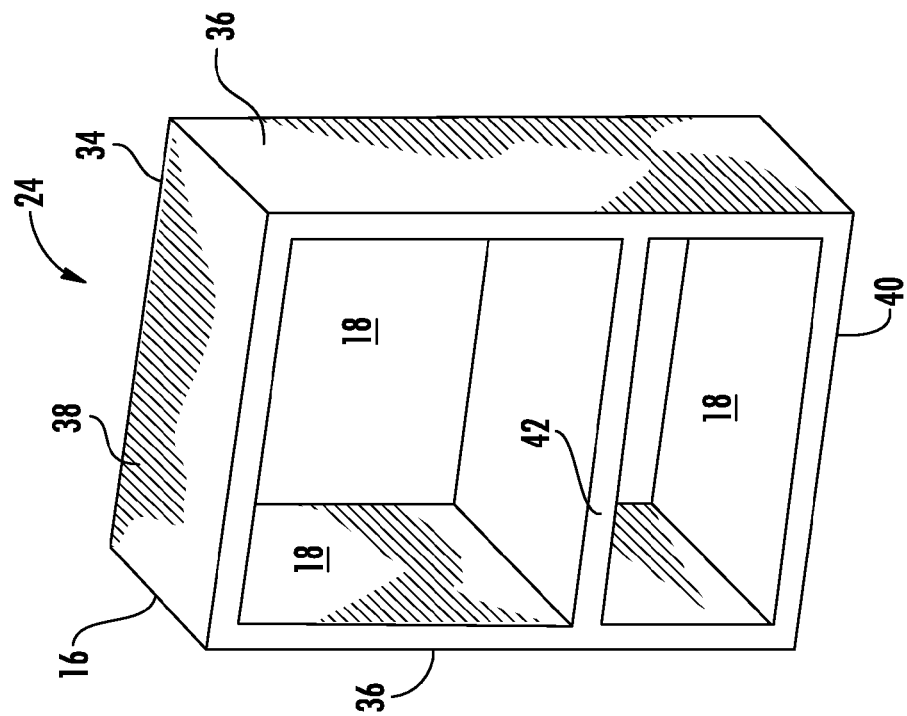
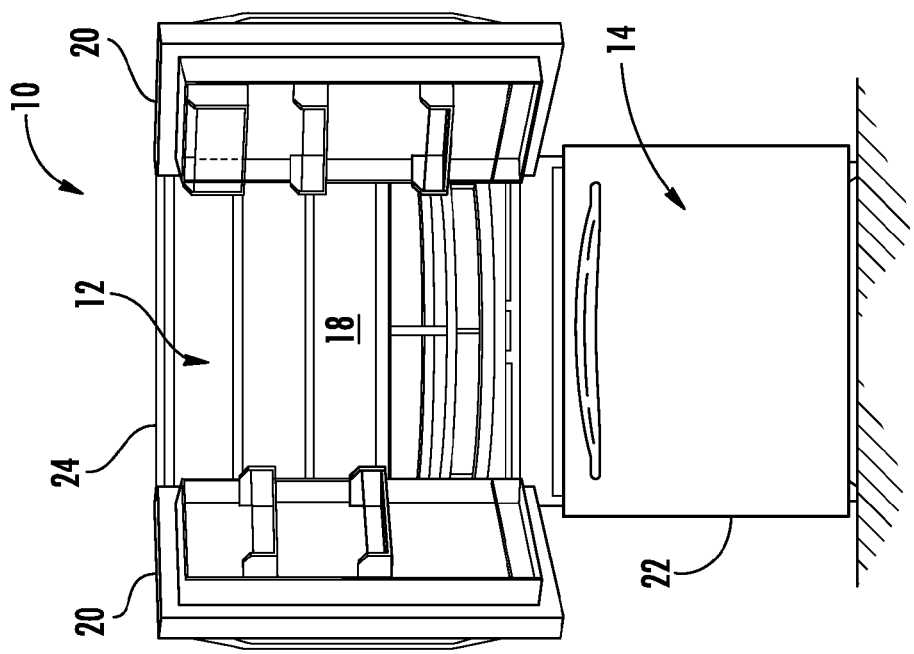

APPLIANCE WITH EXPANDING FOAM MATERIAL

FIELD OF THE INVENTION

The present subject matter relates generally to consumer appliances, such as refrigerators, and more particularly to the injection of expandable foam material into the appliance cabinet.

BACKGROUND OF THE INVENTION

A common manufacturing practice is the injection of an expandable foam material, such as a polyurethane foam, into the double wall cabinet of a refrigeration appliance, such as a refrigerator or freezer, to provide a desired degree of thermal insulation to the appliance. Known foam injecting methods include mixing a predetermined amount of the starting chemicals and injecting them at a predetermined location within a void of a double-wall of the cabinet from which location the foaming process essentially begins. Upon injection, the foaming mixture expands within the void of the double-wall of the cabinet and flowing throughout and between the double-wall of the cabinet.

Before the start of the fill process, a venting hole is created at a predetermined location in the cabinet to release air that would otherwise be trapped in the void of the double-wall cabinet ahead of the advancing foam. Other venting holes may be required at different predetermined locations to avoid pockets of trapped air, which cannot be filled with foam. Preheating of a compartment cavity may also be necessary to increase the activity of the foaming mixture to flow throughout the cavity.

Such prior foaming techniques often result in uneven distribution of the foam within the various contours and spaces of the double-wall cabinet, as well as the formation of air pockets, resulting in decreased insulation performance. In addition, the density of the foam material at various locations cannot be controlled and can vary widely.

Another problem with prior foaming techniques is shrinkage of the foam after it has been injected. Foam shrinkage, particularly on the side panels of certain refrigerators, can create appearance issues such as sink marks that may be undesirable to consumers. One approach that has been attempted to address foam shrinkage is the use of additional parts between the cabinet and internal components to prevent the formation of sink marks. However, these parts add manufacturing complexity and additional expense for the appliance.

Finally, the foam material can be relatively expensive. It is desirable to provide insulation throughout the appliance for purposes of energy efficiency. However, it is also desirable to use only the amount of foam required to properly insulate the appliance and avoid using more. Conventional techniques can introduce more material into the appliance than is needed to properly insulate the appliance.

Accordingly, a consumer appliance with features that improve the installation of foam into the appliance would be useful. More particularly, an appliance having features that help reduce or eliminate foam shrinkage and/or sink marks caused by such shrinkage would be useful. The use of such features while conserving the amount of foam material used in the appliance would also be beneficial. Finally, an improved method for filling the cabinet of a consumer appliance with expandable foam is also desirable.

BRIEF DESCRIPTION OF THE INVENTION

The present invention provides a plurality of fill holes along a rear section or panel of a cabinet for an appliance whereby expandable foam material may be injected at multiple locations into cavities or voids within the cabinet. The plurality of fill holes avoids or minimizes problems with conventional methods such as sink marks, unfilled spaces, and uneven distribution. In certain embodiments, patterns or configurations of the fill holes are provided to e.g., improve the effectiveness of the injection process and conserve the amount of material required to fill the voids in the cabinet. The foam may be an insulating or structural foam material. Related methods are also provided. Additional aspects and advantages of the invention will be set forth in part in the following description, or may be obvious from the description, or may be learned through practice of the invention.

In one exemplary embodiment, the present invention provides an appliance defining a vertical and a lateral direction. The appliance includes a refrigerator cabinet comprising a liner and casing and defining a top panel section, a bottom panel section, side panel sections, and a rear panel section with each section defining one or more voids for the receipt of a foam material. The rear panel section has a plurality of fill holes for injecting foam material into the one or more voids of said refrigerator cabinet.

In another exemplary aspect, the present invention provides a method for filling the internal cavity of an appliance cabinet with an expanding foam material. The method includes the steps of providing a pattern of multiple fill holes in an outer wall of the appliance cabinet positioned at defined locations for injecting foam into identified sections of the cavity; and injecting measured quantities of the foam material into the fill holes in a sequential manner starting at one end of the cabinet and working towards an opposite end of the cabinet so as to sequentially deposit measured amounts of the foam material into the cavity against previously deposited sections of foam material along the length of the cabinet while driving air within the cabinet towards a last section of the cabinet to be filled.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a front perspective view of an exemplary embodiment of a refrigeration appliance with doors shown in an open position.

FIG. 2 is a perspective view of the cabinet from the exemplary refrigerator in FIG. 1.

DETAILED DESCRIPTION OF THE INVENTION

Figure 3:
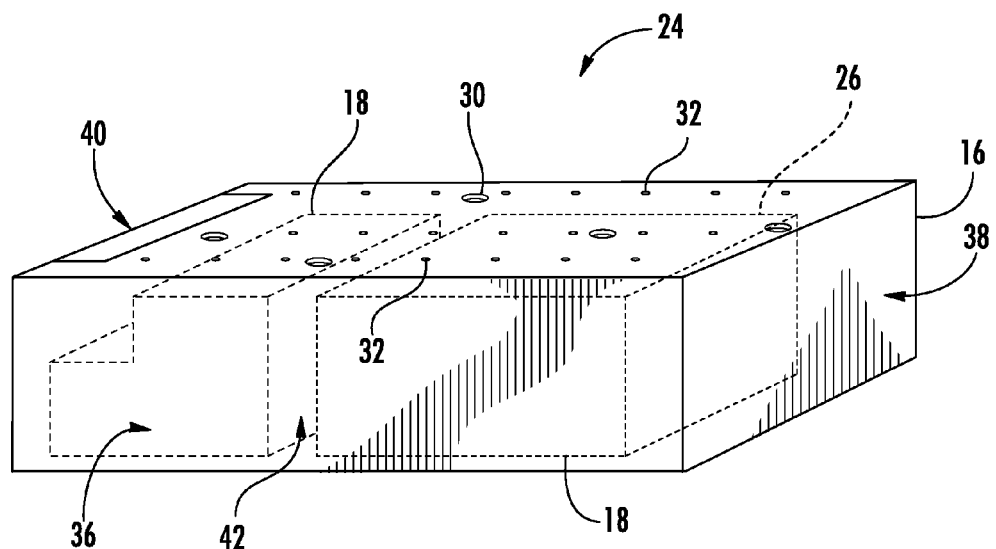
FIG. 3 is a perspective view of the back and one side of the cabinet from FIG. 2 illustrating an exemplary pattern or configuration of a plurality of foam injection or fill holes defined in the back panel section. The cabinet is shown in a horizontal position as might be used during the process of injecting foam materials.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an exemplary refrigeration appliance 10 depicted as a conventional refrigerator. It should be appreciated that the refrigeration appliance of FIG. 1 is for illustrative purposes only. The present invention is not limited to any particular type, style, or configuration of refrigeration appliance, and such appliance may include any manner of refrigerator, freezer, refrigerator/freezer combination, and so forth. In addition, the present invention may be used with other appliance cabinets other than refrigerators as well.

Referring to FIG. 1, the refrigerator 10 includes a fresh food storage compartment 12 with doors 20 arranged above a freezer storage compartment 14 with door 22. The compartments 12, 14 are defined by a respective liner 18 within an outer case 16, which together define a cabinet 24 (FIG. 2). The liners 18 are typically molded from a suitable plastic material. The outer case 16 is normally formed by folding a sheet of a suitable material, such as pre-painted steel, into an inverted U-shape to form outer top, bottom, and side walls of the cabinet 24. A bottom wall of the outer case 16 is normally formed separately and attached to the case side walls and to a bottom frame that provides support for refrigerator 10.

FIG. 2 depicts the cabinet 24 of the refrigerator 10 in its basic form. FIG. 3 depicts the cabinet 24 in a face-down position such that the back panel 34 defines an upper plane. The liner 18 is depicted in phantom within the cabinet 24. The cabinet 24 includes a top panel section 38, side panel sections 36, a bottom panel section 40, a back panel section 34, and an internal rib section 42. Each of these sections includes spaces or voids 26 defined by cabinet 24 and liner 18 into which it is desirable to place foam insulation to improve the efficiency of refrigerator 10. The liner 18 defines the internal compartments of the cabinet 24, as discussed above. The internal voids 26 can be filled with an expandable foam material—such as an insulation foam or a structural foam—in accordance with aspects of the invention as described below.

Figure 9:
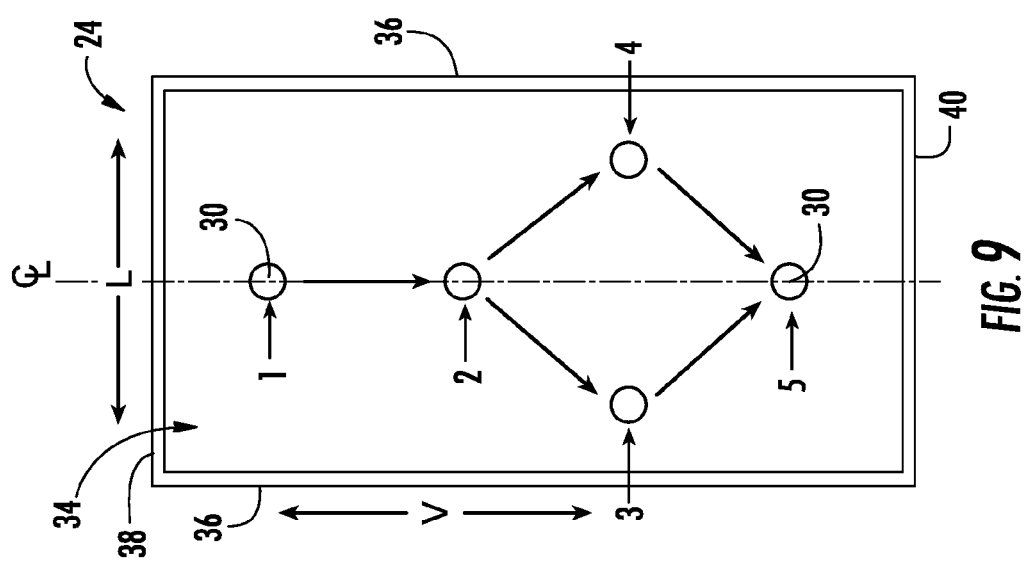
FIG. 9 is a schematic, rear view of the exemplary cabinet for a refrigerator appliance illustrating the exemplary configuration of fill holes defined in the back panel section of the cabinet as shown in FIGS. 3 through 8.

Referring now to FIGS. 3 and 9, for this exemplary embodiment, a kite-shaped pattern of spaced apart fill holes 30 are defined in the outer casing wall 16 along the back panel section 34. These fill holes 30 are strategically located in a kite-shaped pattern that will provide for generally complete and uniform coverage of the injected foam material along defined sections of the cabinet 24. Fill holes 30 are also located close to the respective section of the cabinet they will fill so as to reduce or eliminate any impediments to the foam when filling the voids or cavities in each section.

For example, particular fill holes 30 may be provided in the pattern for primarily filling spaces 26 along the back panel section 34 of the cabinet, while other fill holes 30 may be strategically located for primarily filling spaces 26 along the side panel sections 36, and/or the top and bottom panel sections 38, 40. It should be appreciated that the pattern of holes 30 depicted in FIGS. 3 through 9 is one exemplary embodiment of the invention and other exemplary embodiments will be further described below. Fill holes 30 may be e.g., up to an inch or inch and a half in diameter.

A plurality of smaller, vent holes 32 are also defined in the back panel section 34 of the casing 16. These vent holes 32 may be applied in a uniform or non-uniform pattern and serve to allow air to escape from the internal cavities 26 as the foam material advances through the spaces 26. The invention is not limited by any particular number, size, or location of the vent holes 32.

Figure 4:
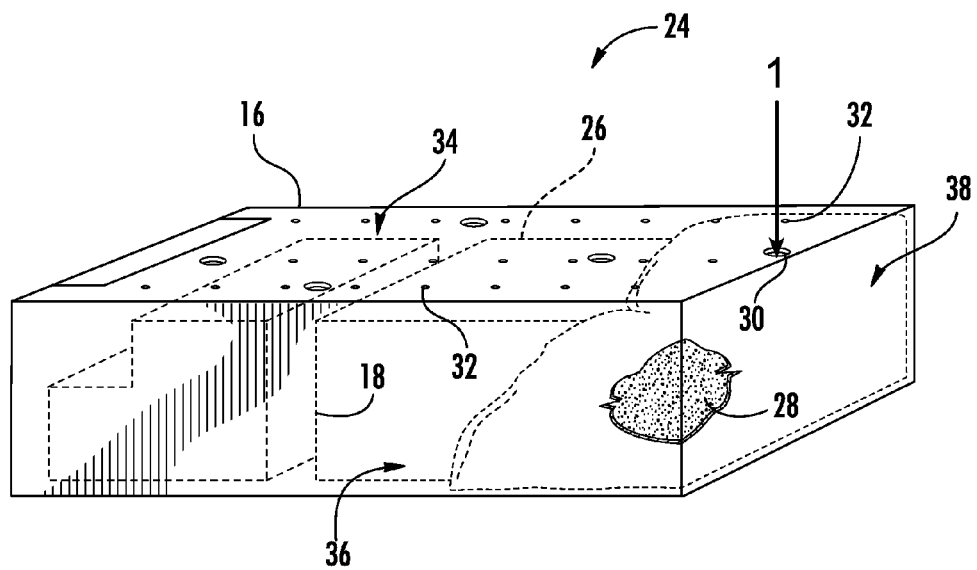
FIGS. 4 through 8 are sequential views of an exemplary foam injection process through the fill holes in the back panel section of the exemplary cabinet of FIG. 3.
Figure 5:
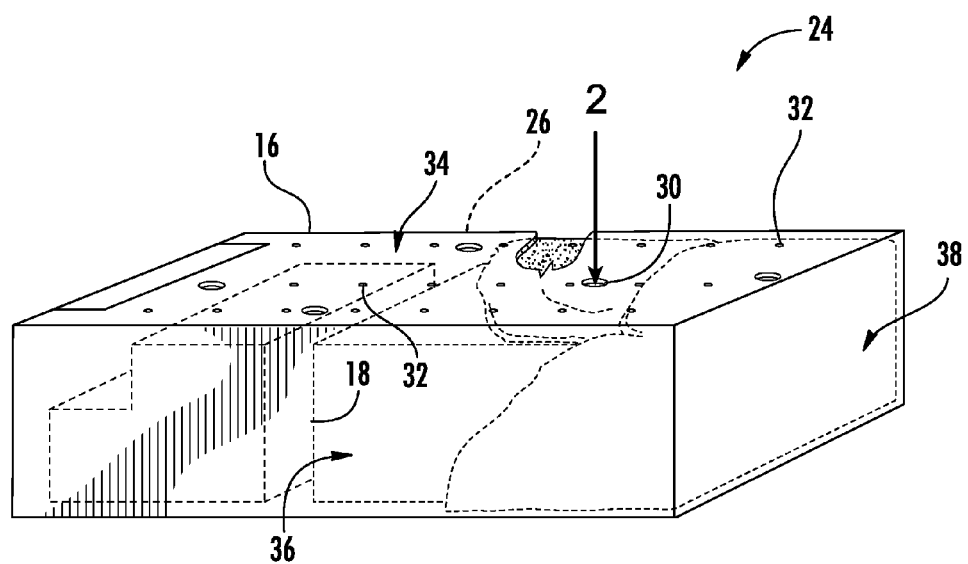

Referring to FIG. 4, a point "1" of initial injection for an expandable foam material 28 is indicated at the fill hole 30 closest to one longitudinal end of the cabinet 24, which in this example is closest to the top panel section 38. It should be appreciated that an "end" also encompasses side panel sections 36. For point 1, this particular fill hole 30 is located at a position such that the foam injected through the hole migrates into the internal cavity 26 along the top panel section 38, as well as partially onto the back panel section 34 and partially along the side panel sections 36, as particularly illustrated by the phantom lines for the foam in FIG. 4. In other words, although there may be a primary target section for any individual fill hole 30, the foam injected into such hole may overlap into other sections. As the foam material is injected into the fill hole 30, air from the internal cavity 26 is forced out in vent holes 32 or towards other unfilled sections of the internal cavity 26.

A measured quantity of the foam material 28 is injected into a fill hole 30 to achieve a desired thermal characteristic along a defined section of the cabinet 24. For example, the top panel section 38 is the top of the fresh food compartment 12 (FIG. 1). It may be desired that this particular section 38 of the cabinet 24 have a thermal insulation characteristic that may be different from the side panel sections 36 along the fresh food compartment, or side panel sections 36 along the freezer compartment 14, and so forth. Thus, the amount or viscosity of the foam material 28 injected into the fill hole 30 at point 1 may have certain characteristics tailored to achieve the desired thermal characteristics along the particular section 38.

The distinct measured quantities of foam material 28 are injected into the fill holes 30 in a sequential manner starting at one end of the cabinet and working towards the opposite end of the cabinet 24. For example, referring to FIG. 5, the second point of injection—point 2—of the foam material 28 is indicated at a fill hole 30 that is strategically located to provide uniform foam distribution essentially along the remaining portion of the top panel section 34 for the fresh food compartment. As can be appreciated from FIG. 5, the measured amount of foam material 28 injected into this second fill hole 30 results in the foam material migrating against the previously deposited section of foam in one direction, and migrating along the back panel section 34 in the opposite longitudinal direction. Any air within the internal cavity 26 that is displaced by injection of the foam 28 vents through any one or a combination of the vent holes 32 or is driven towards the opposite longitudinal end of the cabinet 24.

Figure 6:
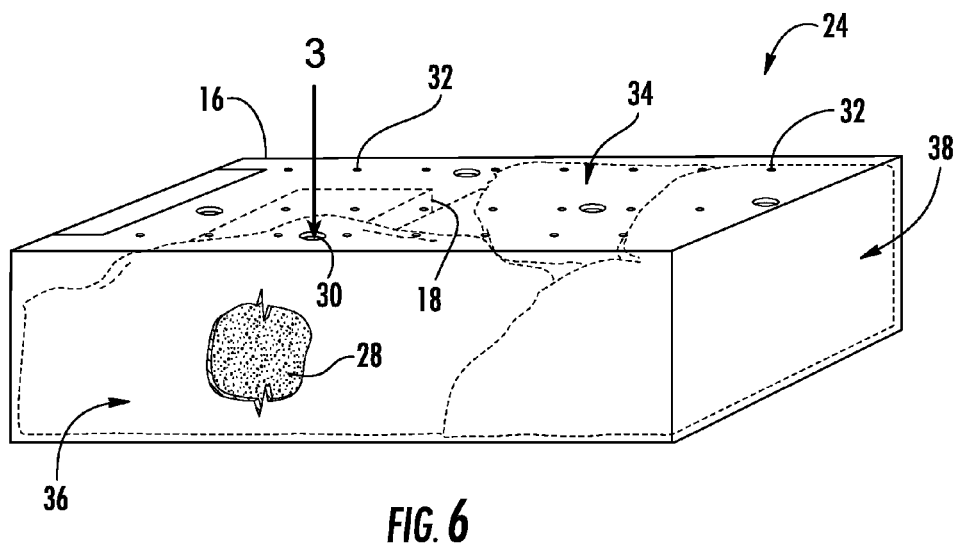

FIG. 6 depicts a next sequential step wherein a third fill hole 30, identified as point 3, is injected with the foam material 28. This hole 30 is strategically located so as to uniformly distribute the foam material 28 along the remaining portions of one of the side panel sections 36. As previously mentioned, the density of the foam material 28 along this section may be different than the density of the foam deposited along the back panel section 34 or the bottom panel section 38. The viscosity of the foam may be regulated to achieve the overall uniform density of the foam material 28 along this section, which may be different from the density of the foam in other sections.

The third fill hole 30 in FIG. 6 is also located so as to distribute the foam within the internal rib section 42 of the cabinet 24. This rib section 42 is part of the component that separates the freezer compartment 14 from the fresh food compartment 12 (FIG. 1). Again, the density of the foam 28 within this rib section 42 may be different from other sections of the foam 28.

Figure 7:
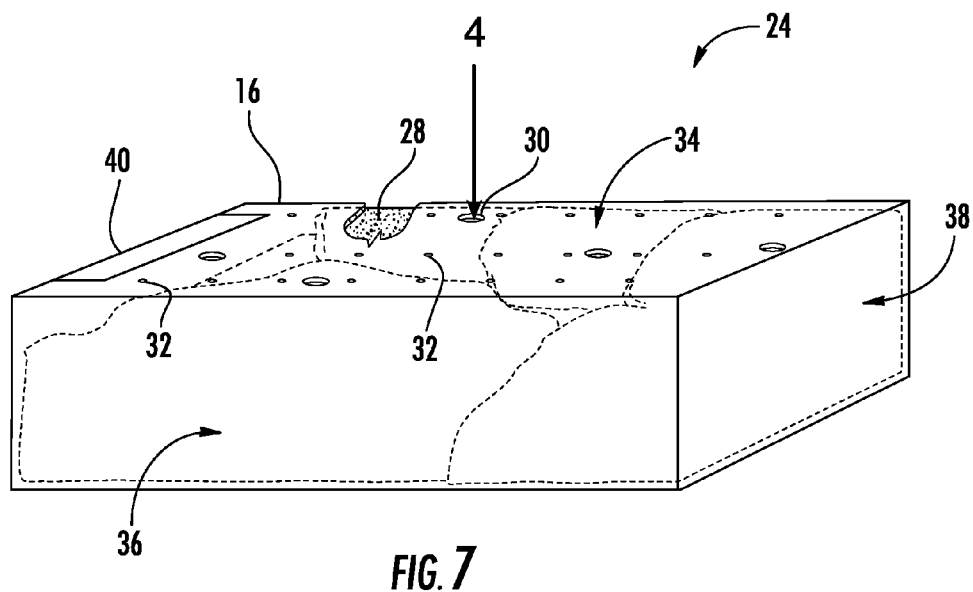

FIG. 7 depicts the next sequential step wherein a fourth fill hole 30, designated as point 4, is injected with the foam 28 in order to fill any remaining section of the internal rib 42, as well as the opposite side panel section 36. The third and fourth fill holes 30 (points 3 and 4, respectively) also serve to distribute the foam 28 along a section of the back panel section 34, as depicted in FIG. 7 by the phantom lines.

Figure 8:
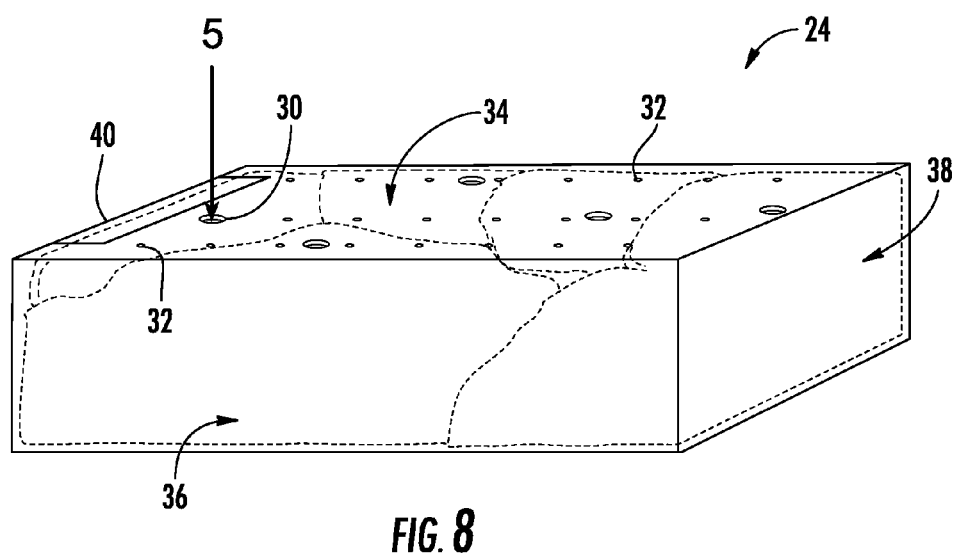

FIG. 8 depicts a next sequential step wherein a fifth fill hole 30, designated as point 5, is injected with the foam material 28. This hole is strategically located to uniformly distribute the foam 28 along a section of the back panel 34 adjacent to the freezer compartment, as well as along the bottom panel section 40. It may be desired that the density of the foam in this area is greater than, for example, the density of the foam at the opposite top panel section 38.

It should be appreciated from the figures, that the identified "sections" of the cabinet 24 need not be well-defined. For example, it is difficult to control the migration of the foam 28 within the internal cavity spaces 26 without an inordinate amount of fill holes 30. However, the fill holes 30 can be strategically located so as to inject the foam material such that the foam migrates generally to an identified section of the cabinet, for example primarily along the top panel section, bottom panel section, and so forth. The holes may also serve to deposit the foam material 28 along different sections simultaneously. For example, as discussed above with respect to the third and fourth fill holes 30 (points 3 and 4 in FIGS. 6 and 7), foam material can be injected here simultaneously such that the foam material migrates into the internal rib 42, as well as along a portion of the side panel sections 36 as the same time.

The overall sequence described above is also indicated by directional arrows in the schematic of FIG. 9. The directional arrows also outline the overall kite-shape configuration formed by five holes 30 for this exemplary embodiment. This configuration can also be described as having five holes where three holes 30 (points 1, 2, and 5) are aligned along the vertical direction V and positioned substantially along the centerline C/L of the cabinet. The two remaining fill holes 30 (points 3 and 4) are aligned along the horizontal direction, on opposing sides of the centerline of the appliance, and positioned substantially adjacent to a rib section 42 of the cabinet where the rib section 42 separates certain compartments of the refrigerator 10 as previously described. Alternatively, fill holes 30 at points 3 and 4 can be positioned at about the middle of the cabinet 24 along the vertical direction V.

As shown in FIG. 9, the first fill hole 30 (point 1) would result in application of the foam material along the top panel section 38 and side panel sections 36. The second fill hole 30 (point 2) would primarily apply foam material along the side panel sections 36 and a portion of the back panel section 34. The next subsequent fill holes 30 in the longitudinal direction indicated by the arrows and points 3 and 4 would primarily apply the foam material along the side panel sections 36, a portion of the back panel section 34, and internal rib section 42, wherein the combination of these two holes 30 would result in merger of the foam material along the back panel section 34 and rib section 42. The remaining fill hole 30 (point 5) would be used to apply the foam material along the bottom panel section 40 and perhaps parts of side panel sections 36.

The amount of foam material to be injected into each of the identified sections of the cabinet 24 may be determined in various ways. For example, the amount and viscosity of the foam material may be empirically determined based on a trial and error method wherein numerous cabinets 24 for a given refrigerator design are injected, allowed to solidify, and then cut open to record the results of the injection process. In another embodiment, the amount and viscosity of the foam material for the different identified sections may be determined by computer modeling, or calculations based on the known dimensions of the various internal cavity spaces 26.

The sequential injecting steps may be performed so that the previously injected amount of foam material does not significantly solidify before the adjacent section of the cabinet is injected with foam material. This may be done to prevent the formation of voids or air pockets between the adjacent sections of foam material 28. Some degree of "skinning" may be acceptable between the adjacent foam sections without significant solidification of one section prior to injection of the next adjacent section.

The invention is not limited to the particular number and configuration of fill holes 30 shown in FIGS. 5 through 9. The location and number of holes 30 will depend, for example, on the design and structure of the particular refrigerator cabinet 24, as well as the desired thermal characteristics for the various cabinet sections. In this regard, FIGS. 10 through 12 depict different configurations or patterns of fill holes 30 that may be utilized.

Figure 10:
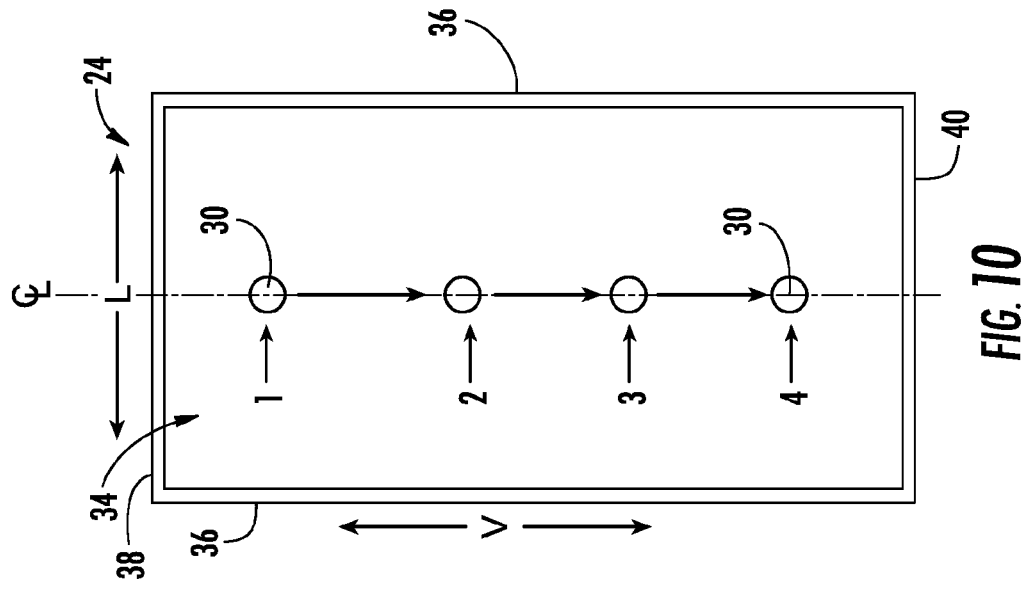
FIGS. 10-12 illustrate still other exemplary configurations of fill holes of the present invention.
Figure 11:
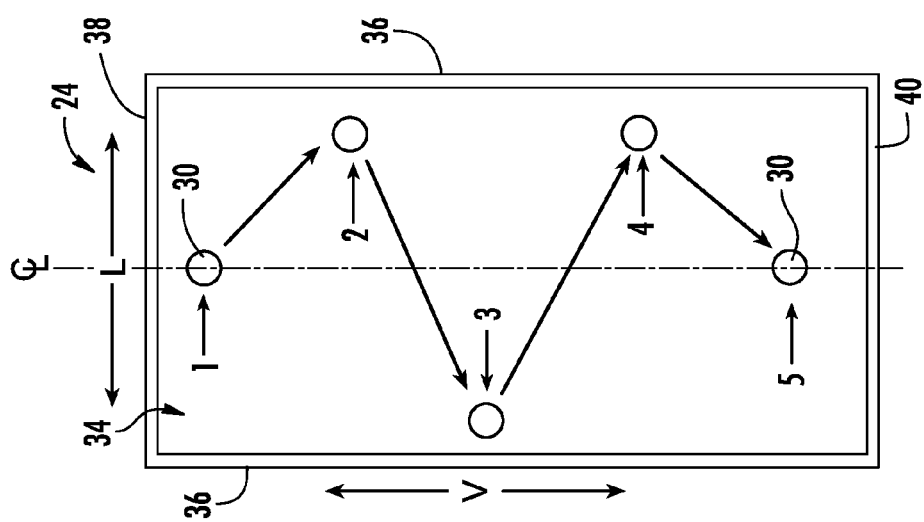

For example, FIG. 10 depicts a linear progression of fill holes 30 in a relatively straight line along the back panel section 34. More particularly, fill holes 30 are aligned along the vertical direction V and positioned substantially along centerline C/L of cabinet 24. The first fill hole 30 (point 1) would be used to inject foam along the top panel section 38 and a portion of the back panel section 34 and side panel sections 36. The injection process proceeds from one longitudinal or side end of the cabinet 24 towards the opposite longitudinal or side end, as depicted by the arrows in FIG. 10 and the numbering of points 1, 2, 3, and 4. The next sequential fill hole 30 (point 2) would result in application of the foam material along an adjacent section of the top panel section 34 and side panel sections 36, and so forth.

In the embodiment of FIG, 11, the fill holes 30 are located in a zig-zag configuration with points 1 through 5 indicating the sequence of the fill. with foam material. More particularly, holes 30 and at fill points 1 and 5 are located substantially along centerline C/L of cabinet 24, spaced apart along vertical direction V, and located near the top and bottom of cabinet 24 as shown. Holes 30 at fill points 2, 3, and 5 are spaced apart along vertical direction V and spaced apart along lateral direction L from the centerline C/L with points 2 and 4 positioned on opposite sides of centerline C/L from point 3. Point 3 is located substantially at the middle of cabinet 24 along vertical direction V. As such, holes 30 at fill points 2, 3, and 4 primarily fill the side sections 36 while the holes at fill points 1 and 5 primarily fill top and bottom panel sections 38, 40. The hack panel section 34 would be filled by the combined partial sections resulting from the injection application of the fill holes 30 along points 1 through 5 in the direction indicated in FIG. 11.

Figure 12:
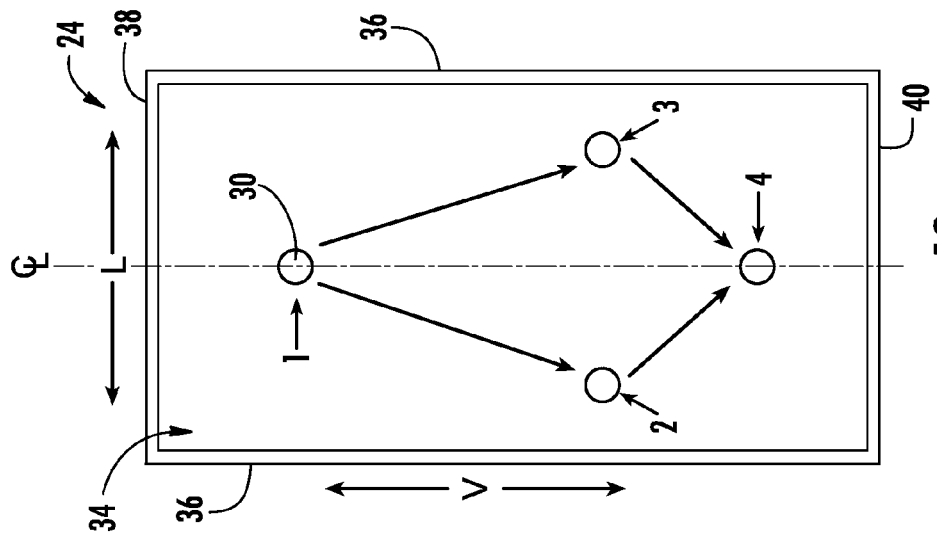

FIG. 12 provides another exemplary embodiment where holes 30 are arranged in a diamond configuration with the sequence of filling indicated by points 1, 2, 3, and 4 where points 2 and 3 may be filled simultaneously. Holes 30 at points 1 and 4 are located primarily along centerline C/L of cabinet 24 while holes 30 at points 2 and 4 are positioned on either side of the centerline, are aligned substantially along lateral direction L, and are positioned substantially at the middle of cabinet 24 along vertical direction V. Hole 30 at point 1 would primarily fill top panel section 38, back panel section 34, and portions of side panel sections 36. Holes 30 at points 2 and 3 would primarily fill rib panel section 42, back panel section 34 and portions of side panel sections 36. Hole 30 at point 4 would primarily fill back panel section 34 and bottom panel section 40.

Cabinets having holes 30 in the configurations substantially as shown in FIGS. 9, 10 and 12 were constructed. Each was filled with a foam material in the sequences shown in FIGS. 9, 10, and 12 using a foam material of substantially the same foam density for each cabinet. The cabinet resembling FIG. 9 required 17.7 pounds dry weight of foam material. The cabinet resembling FIG. 10 required 18.06 pounds dry weight of foam material. The cabinet resembling FIG. 12 required 18.2 pounds of foam material. Finally, a cabinet having only three fill holes arranged vertically along centerline C/L of the cabinet required 18.7 pounds of foam material. Accordingly, the amount of foam material required to insulate the cabinet is significantly and surprisingly impacted by the number and configuration or pattern for holes 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance defining a vertical and a lateral direction, the appliance comprising:
   a cabinet comprising a liner and casing and defining a top panel section, a bottom panel section, side panel sections, and a rear panel section with each section defining one or more voids for the receipt of a foam material;
   wherein the rear panel section has a plurality of fill holes for injecting foam material into the one or more voids of the cabinet, each fill hole located for primarily filling one or more voids of one of the sections defined by the liner and casing with an amount of foam material determined for the section,
   wherein the plurality of fill holes are not positioned symmetrically along both the vertical and lateral directions, and
   wherein a first fill hole is positioned to achieve a first thermal characteristic in the top panel section of the cabinet and a second fill hole is positioned to achieve a second thermal characteristic in the bottom panel section of the cabinet.

2. An appliance as in claim 1, wherein the plurality of fill holes are spaced apart and aligned along the vertical direction.

3. An appliance as in claim 2, wherein the plurality of fill holes are positioned so as to provide foam material into the top panel section, bottom panel section, side panel sections, and rear panel section.

4. An appliance as in claim 3, wherein the plurality of fill holes are positioned substantially along a centerline of the appliance.

5. An appliance as in claim 3, wherein the plurality of fill holes includes four fill holes.

6. An appliance as in claim 1, wherein the plurality of fill holes are arranged in a kite-shaped configuration.

7. An appliance as in claim 1, wherein the plurality of fill holes comprises five fill holes with three of the five fill holes positioned substantially along a centerline of the appliance, and the remaining two of the five fill holes positioned on opposing sides of the centerline of the appliance.

8. An appliance as in claim 1, wherein the plurality of fill holes comprise five fill holes with three of the five fill holes positioned substantially along a centerline of the appliance, and two of the five fill holes positioned on opposing sides of a centerline of the appliance at about a middle of the appliance along the vertical direction.

9. An appliance as in claim 1, wherein the cabinet further comprises a rib panel section, and wherein the plurality of fill holes comprise five fill holes with three of the five fill holes positioned substantially along a centerline of the appliance, and two of the five fill holes positioned on opposing sides of a centerline of the appliance and adjacent to the rib panel section.

10. An appliance as in claim 1, wherein the plurality of fill holes are spaced apart along the vertical direction and arranged in a zig-zag configuration.

11. An appliance as in claim 1, wherein the plurality of fill holes comprise five fill holes with two of the five fill holes aligned along the vertical direction and positioned at a top and a bottom of the rear panel respectively along a centerline of the appliance, and with the remaining three fill holes positioned in an opposing manner about the centerline of the appliance.

12. An appliance as in claim 1, wherein the plurality of fill holes comprise five fill holes with three of the five fill holes spaced apart vertically and positioned substantially along a centerline of the appliance, and with the remaining two of the five fill holes positioned on opposing sides of the centerline of the appliance.

13. An appliance as in claim 1, wherein the plurality of fill holes comprise five fill holes with three of the five fill holes positioned substantially along a centerline of the appliance, and two of the five fill holes positioned on opposing sides of the centerline of the appliance at about the middle of the appliance along the vertical direction.

14. An appliance as in claim 1, wherein the cabinet further comprises a rib panel section, and wherein the plurality of fill holes comprise five fill holes, with two of the five fill holes positioned adjacent to the rib panel section.

15. An appliance as in claim 1, wherein the plurality of fill holes comprise four fill holes with two of the four fill holes positioned substantially along a centerline of the appliance, and two of the four fill holes positioned on opposing sides of the centerline of the appliance.

16. An appliance as in claim 1, wherein the plurality of fill holes comprise four fill holes with two of the four fill holes positioned substantially along a centerline of the appliance, and two of the four fill holes positioned on opposing sides of the centerline of the appliance at about a middle of the appliance along the vertical direction.

17. An appliance as in claim 1, wherein the refrigerator further comprises a rib panel section, and wherein the plurality of fill holes comprise four fill holes with two of the four fill holes positioned substantially along a centerline of the appliance, and two of the four fill holes positioned on opposing sides of the centerline of the appliance and adjacent to the rib panel section.

18. An appliance as in claim 1, wherein the amount of foam material is determined for each section such that a density of the foam material in one section is different from the density of the foam material in at least one other section.

19. An appliance defining a vertical and a lateral direction, the appliance comprising:
- a cabinet comprising a liner and casing and defining a top panel section, a bottom panel section, side panel sections, and a rear panel section with each section defining one or more voids for the receipt of a foam material;
- wherein the rear panel section has a plurality of fill holes for injecting foam material into the one or more voids of the cabinet, each fill hole located for primarily filling one or more voids of one of the sections defined by the liner and casing with an amount of foam material measured for the section,
- wherein the plurality of fill holes are arranged in a kite-shaped pattern, and
- wherein a first fill hole is positioned to achieve a first thermal characteristic in the top panel section of the cabinet and a second fill hole is positioned to achieve a second thermal characteristic in the bottom panel section of the cabinet.

20. An appliance defining a vertical and a lateral direction, the appliance comprising:
- a cabinet comprising a liner and casing and defining a top panel section, a bottom panel section, side panel sections, and a rear panel section with each section defining one or more voids for the receipt of a foam material;
- wherein the rear panel section has a plurality of fill holes for injecting foam material into the one or more voids of the cabinet, each fill hole located for primarily filling one or more voids of a section defined by the liner and casing, wherein the plurality of fill holes are spaced apart along the vertical direction and arranged in a zig-zag configuration,
- wherein an amount of foam material to be injected into the one or more voids is determined for each section, and
- wherein a first fill hole is positioned to achieve a first thermal characteristic in the top panel section of the cabinet and a second fill hole is positioned to achieve a second thermal characteristic in the bottom panel section of the cabinet.

* * * * *